F. M. SNIVELY.
Mail-Bag Holders.
No. 148,518. Patented March 10, 1874.
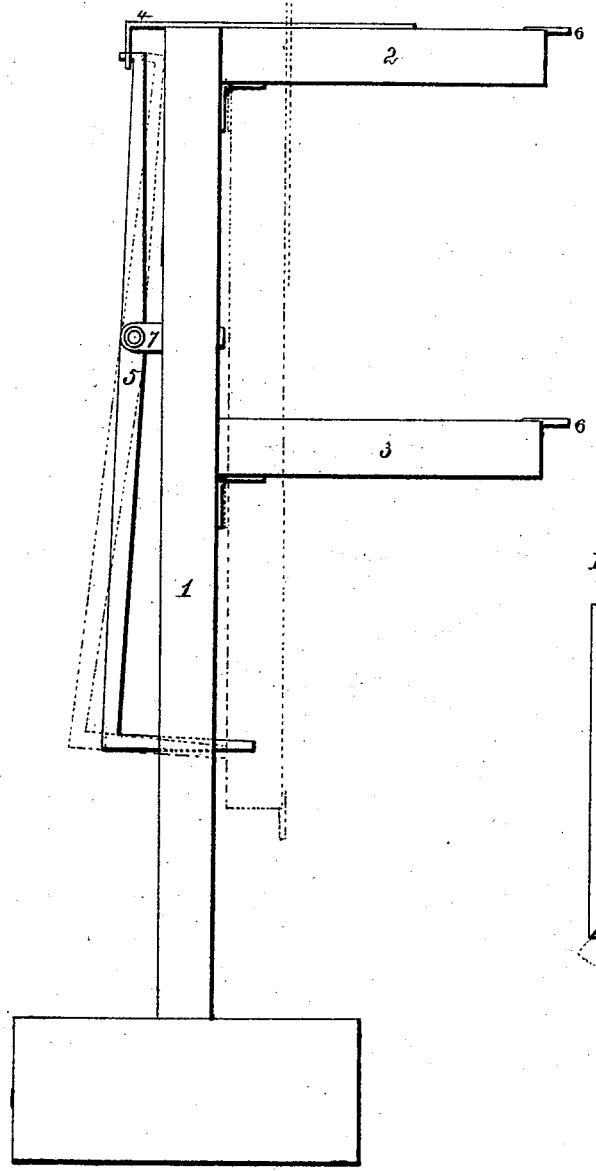
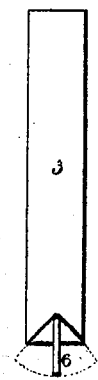
WITNESSES.
INVENTOR.

UNITED STATES PATENT OFFICE.

FRANCIS M. SNIVELY, OF BELLAIRE, OHIO.

IMPROVEMENT IN MAIL-BAG HOLDERS.

Specification forming part of Letters Patent No. 148,518, dated March 10, 1874; application filed July 7, 1873.

*To all whom it may concern:*

Be it known that I, FRANCIS M. SNIVELY, of Bellaire, county of Belmont and State of Ohio, have invented certain new and useful Improvements in Mail-Bag Holders, of which the following is a specification:

The nature of my invention relates to an improvement in mail-bag holders; and it consists in the arrangement and combination of devices, which will be more fully described hereafter, whereby the two arms or supports, from which the bag is suspended, instantly close as soon as the bag is taken off, and thus save the trouble of turning them around out of the way of passing trains.

Figure 1 is a side elevation of my invention. Fig. 2 is a plan view of one of the arms.

1 represents a standard, of suitable height, which is placed in a convenient position near the railroad-track, and has the two arms 2 3 hinged to its front side. The upper arm 2 has a catch, 4, of any suitable kind, for engaging with the out-turned end of the eccentrically-pivoted lever 5, so as to support it in a horizontal position for receiving the mail-bag, while the lower one, 3 is simply hinged to the standard and is held in a horizontal position by the mail-bag suspended from the upper one. Each of these arms has a triangular recess cut in its outer end, in which are pivoted the arms 6, so as to move from side to side, and let the bag easily off in either direction as the train passes by. Pivoted between the ears 7, on the rear side of the standard, is the lever 5, having a hook formed upon its upper end, and its lower one bent inward, so as to pass through and project beyond the front side of the standard.

As the train passes, taking off the bag, the lower arm, having nothing to support it any longer, instantly falls, and, striking the projecting end of the lever 5, releases the hook from the catch 4, when the upper arm falls also, the two assuming the position shown in dotted lines, and thus saving the trouble of turning them around out of the way of passing trains.

Having thus described my invention, I claim—.

The combination of the hinged arms 2 3, standard 1, and lever 5, substantially as shown and described.

In testimony that I claim the foregoing as my invention I hereunto affix my signature this 27th day of June, 1873.

FRANCIS M. SNIVELY.

Witnesses:
 J. W. KING,
 JAMES F. ANDERSON.